(No Model.)

H. O. DUNN.
ANCHOR.

No. 543,129. Patented July 23, 1895.

Witnesses.
Samuel Peters.
Jno. R. King.

Inventor.
H. O. Dunn.

United States Patent Office.

HERBERT O. DUNN, OF BALTIMORE, MARYLAND.

ANCHOR.

SPECIFICATION forming part of Letters Patent No. 543,129, dated July 23, 1895.

Application filed October 19, 1894. Serial No. 526,380. (No model.)

*To all whom it may concern:*

Be it known that I, HERBERT O. DUNN, a citizen of the United States, residing at Baltimore, Maryland, have invented an Improvement in Anchors, of which the following is a specification.

My improvement relates to that part of the anchor containing the shank-head and axial bolt or pin, whereby I entirely remove all strain from the axial bolt by an improved form of the shank-head. I also by improving the shape of the anchor-crown make a stock and crown combined, whereby efficiency of the anchor is gained in quick biting of the flukes. I attain these new objects by mechanism illustrated in the accompanying drawings, in which—

Figure 1:
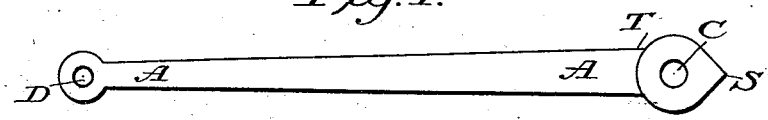

Figure 1 is an elevation of the shank A A with a cylindrical opening D for the pin of the anchor-shank and a cylindrical opening C, through which passes the axial bolt P P. The improvement of the shank-head is shown at S, where the wedge-shaped pointed end with two plane faces takes against the inside of the crown H H, Fig. 4, when the flukes B B have revolved to their full holding angle. Fig. 4, which shows most completely the improvement, is a section of the anchor through X X of Fig. 3, Fig. 3 being a horizontal plan of the anchor.

In Fig. 4, which shows the section of the anchor in its holding position, S indicates the pointed wedge-shaped shank-head with one plane face taking against the inside face of the longitudinal opening of the crown. T shows the neck of the shank that takes against *t*, the inside face opposite, and as these two points of contact are on opposite sides of the axial bolt P P all strain is thus removed from the said bolt when the anchor is being broken out of its holding position in the ground. The combined crown H H and flukes B B revolve on the axial bolt P P to the same angle on the other side of the longitudinal line of the shank, where similar action takes place against *t'*, and perfect immunity from strain on the axial bolt is thus obtained.

Figure 2:
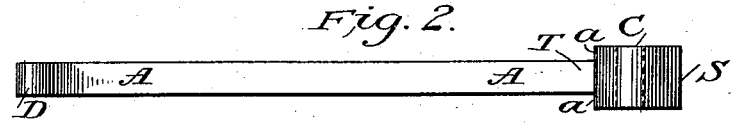
Figure 3:
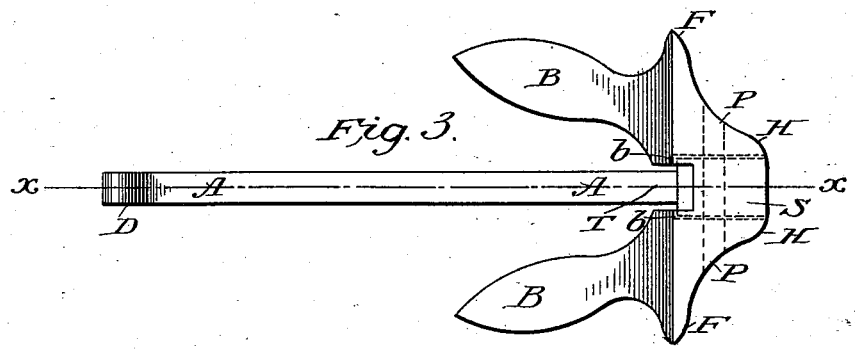
Figure 4:
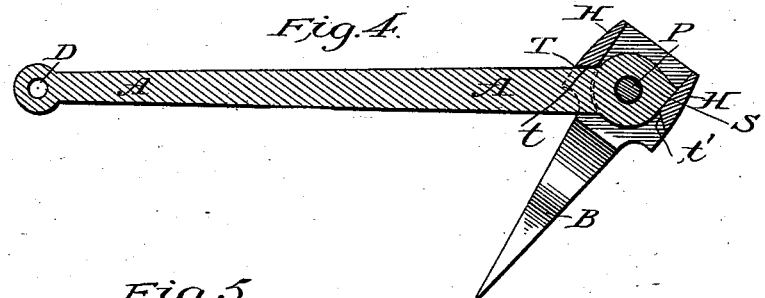

Fig. 2 is a plan of the shank, showing the enlarged shank-head and the round projecting shoulders *a a*, which take against the corresponding shoulders at *b b*, Fig. 3, on the inside of the central longitudinal opening in the crown H H. This prevents the shank from pulling out if the axial bolt is lost and also relieves the strain on the axial bolt when the chain pulls on the shank as the cylindrical hole C is made larger than the axial bolt P P.

Fig. 3 shows the combined flukes B B and crown H H with its central longitudinal opening, in which the enlarged shank-head actuates on the axial bolt P P. The combined flukes B B and crown H H turn on the axial bolt P P to about fifty degrees each side of the longitudinal line of shank A A, thus insuring the engagement of the flukes whichever way the anchor falls. The engagement of the flukes is further insured by the spread of the flukes B B, and still further by the improved elongated shape of the crown, the projections F F performing the functions of a stock in combination with the crown. This new improvement compels the anchor to assume a horizontal position on striking bottom and quick "biting" of the flukes immediately follows.

Figure 5:
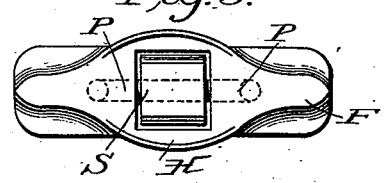

Fig. 5 is a view of the anchor from the crown, showing the central longitudinal opening in which the shank is inserted; also the stock-shaped crown and the axial bolt P P, which connects the crown and shank.

Having thus described my invention, what I claim as new, and desire to secure by Letters Patent, is—

1. In an anchor having two spread flukes integral with an elongated crown piece containing a central longitudinal opening contracted on the fluke side; an enlarged headed shank with a wedge shaped point having two plane bearing faces forming an acute angle at end of shank head, one face of which bears against the inside of central longitudinal opening of crown while neck of shank takes against the other side to relieve bolt strains, said shank head actuating in longitudinal crown opening and containing a transverse cylindrical opening in combination with an axial bolt passing transversely through both shank head and crown piece allowing flukes to actuate each side of shank substantially as specified.

2. In an anchor having a locking shank head with a wedge shaped point having two plane bearing surfaces, actuating in a central longitudinal opening of crown piece by means of an axial bolt passing transversely through crown piece and cylindrical opening of shank head; an elongated crown, integral with two spread flukes, having transverse projections in plane of flukes performing the functions of a stock, the flukes actuating on each side of shank in combination with axial bolt substantially as specified.

Signed at Baltimore, in the State of Maryland, this 21st day of September, 1894.

H. O. DUNN.

Witnesses:
SAMUEL REBER,
JNO. R. KING.